Dec. 12, 1933.  A. A. CANTON  1,939,539

TEMPERATURE REGULATOR

Filed Oct. 1, 1931

INVENTOR.

ALLEN A. CANTON

BY Leon Edelson

ATTORNEY.

Patented Dec. 12, 1933

1,939,539

UNITED STATES PATENT OFFICE 1,939,539

TEMPERATURE REGULATOR

Allen A. Canton, New York, N. Y.

Application October 1, 1931. Serial No. 566,254

3 Claims. (Cl. 62—91.5)

This invention relates to temperature regulators and more particularly to a mechanism or device for automatically controlling the pressure of a confined refrigerant gas.

Among the principal objects of the present invention is the provision of means for automatically regulating the temperature within a compartment cooled by the use of solidified carbon dioxide or "dry ice".

A further object of the invention is the provision of a mechanism which is operative automatically to maintain the pressure generated within a "dry ice" container within predetermined limits so as to not only prevent a too rapid evaporation of the dry ice but also to insure a more uniform and higher degree of refrigeration than has been possible heretofore.

Still another object of the invention is the provision of a dry ice container equipped with an automatically operative vent for preventing too great a pressure to be generated within the container, this vent being operative, however, only in the event that the temperature within the compartment to be refrigerated by the dry ice is maintained at or below a predetermined maximum. In order to attain this object the dry-ice container is further equipped with means automatically operative when the temperature rises above said predetermined maximum to cause the refrigerant gas to pass into and through the compartment to be refrigerated, thereby lowering the temperature thereof to the limit desired.

Still another object of the invention is the provision of a dry-ice container having thermostat-controlled means for governing the amount and direction of flow of the gas generated through the vaporization of the solidified carbon dioxide, this means being operative to regulate, within certain predetermined limits, the temperature within the compartment to be refrigerated.

Other objects and advantages of the invention will appear more fully hereinafter.

The invention consists substantially in the combination, construction, arrangement and relative location of parts, all as will be described more fully hereinafter, as shown in the accompanying drawing, and as finally pointed out in the appended claims.

In the said accompanying drawing:—

Figure 1:
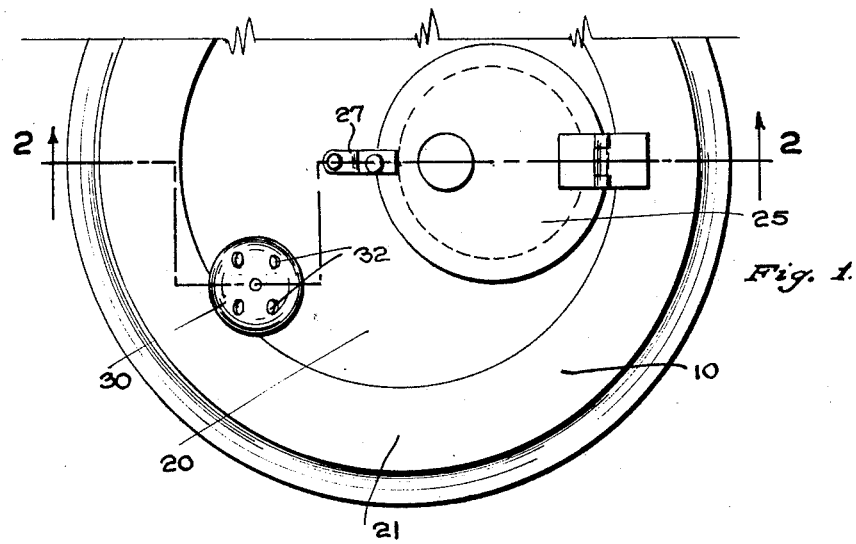
Figure 2:
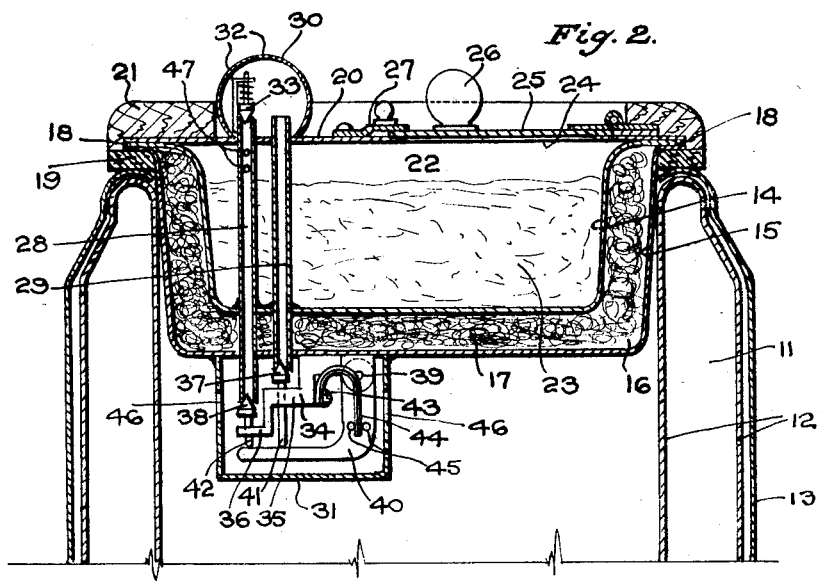

Figure 1 is a partial top plan view of the mechanism constructed in accordance with and embodying the principles of the present invention; and Figure 2 is a vertical sectional view of the mechanism taken on the line 2—2 of Figure 1.

Referring now more particularly to the drawing, it will be observed that the cooling unit, designated generally by the reference numeral 10, is shown in the form of a top or cap for a receptacle 11. This receptacle 11 is adapted to contain food or other material the temperature of which is to be maintained within certain predetermined limits. In the particular illustration shown, the receptacle 11 is in the form of a vacuum container having the usual double wall 12 and an outer casing 13.

The cooling unit 10 is adapted to seal the normally open end of the vacuum container and, as shown in Figure 2, is generally plug-shaped. As appears most clearly in Figure 2, the plug-shaped unit 10 comprises a pair of cup-shaped members 14 and 15 nested together in such manner as to provide a space 16 therebetween which is adapted to be filled with heat-insulating material 17. The upper flanged edges of the members 14 and 15 are secured together in overlapping relation, as at 18. Secured to and underlying the flanged portion of the assembled members 14 and 15 is a gasket 19 of cork or similar material. Extending across the top of the member 14 is a plate 20, this plate being secured in position by an annulus 21. Any suitable means may be provided for securing the cork gasket 19 and the annulus 21 together in such manner as to maintain the plate 20 in permanently assembled relation with respect to the cup-shaped members 14 and 15.

It will be observed that these cup-shaped members 14 and 15 form in effect a double-walled container or chamber 22 within the interior of which is adapted to be received solidified carbon dioxide 23, the latter being more popularly known as "dry ice". The top wall 20 of the chamber 22 is preferably provided with a filling opening 24 through which the dry ice is introduced into the chamber, this opening 24 being normally sealed by means of a hinged cover 25 having a lifting knob 26. The cover 25 is locked in closed position by a pivoted clasp 27 or the like.

Extending vertically through the top and bottom walls of the unit 10 are a pair of tubes 28 and 29 the opposite ends of which respectively project beyond the top plate 20 and the double-walled bottom of the unit 10. Secured to the top plate 20 and enclosing the upper ends of the tubes 28 and 29 is a substantially spherically-shaped member 30, while secured to the external member 15 of the bottom wall is a box-like member 31 enclosing the lower ends of the tubes 28 and 29.

Provided in the wall of the spherically-shaped element 30 are a plurality of apertures 32 constituting vents to the atmosphere. Arranged within the interior of the member 30 and adapted to normally seal the upper end of the tube 28 is a spring-pressed valve 33. Arranged within the interior of the bottom casing 31 is a bracket 34 having the laterally extending vertically offset branches 35 and 36 which respectively constitute guides for the valve stems of a pair of valves 37 and 38, these valves 37 and 38 being respectively adapted to seal the bottom ends of the tubes 28 and 29.

Pivotally secured, as at 39, to the bracket 34 is the valve-actuating member 40, this member 40 being in the form of a bell crank lever the freely extending branch of which is in contacting engagement with the bottom ends of the valve stems 41 and 42. Secured to the bracket 34, as by a set screw 43, is a bi-metallic thermostat element 44, the free end of this element being received between a pair of pins 45 carried by the pivoted member 40. The casing 31 is provided in the walls thereof with a plurality of apertures 46 for a purpose which will be apparent immediately hereinafter. The tube 28 is also provided with one or more apertures 47 located immediately beneath the top plate 28 of the unit 10.

The operation of the mechanism as just described is as follows. As the dry ice 23 contained within the chamber 22 vaporizes or sublimes a gas is generated the pressure of which builds up within the chamber 20. The bi-metallic thermostat 44 is designed to operate only in the event that the temperature within the interior of the receptacle or compartment 11 rises above a predetermined limit. Assuming that this temperature does rise above this predetermined limit, the bi-metallic thermostat 44 immediately becomes operative to cause the bell crank lever 40 to shift in a counter-clockwise direction in consequence of which the valves 37 and 38 are permitted to drop away from the bottom ends of the tubes 29 and 28. Immediately that the valve 38 opens the refrigerant gas generated within the chamber 22 enters the tube 28 through the apertures 47 therein and then passes downwardly through this tube into the interior of the compartment 11 by way of the apertures 46 provided in the casing 31. As this gas circulates within the compartment 11 the temperature therewithin drops to a predetermined bottom limit whereupon the bi-metallic thermostat becomes immediately operative to reseat the valves 37 and 38 and so prevent the further passage of the refrigerant gas into the interior of the compartment 11. The circulation of the refrigerant gas within the interior of the compartment 11 is facilitated by the provision of the valve 37 which permits the heated air within the compartment 11 to escape by way of the tube 29 as said heated air is displaced by the refrigerant gas supplied to the compartment to be refrigerated by way of the tube 28.

Should it happen that the temperature within the compartment 11 does not rise above the predeterminedly fixed maximum, the refrigerant gas generated within the chamber 22, when it reaches a predetermined pressure, may be vented through the valve 33, it being understood that this latter valve is operative to vent the refrigerant gas to the atmosphere only in the event that the pressure thereof within the chamber becomes sufficiently high to unseat the valve 33.

It will be understood of course that the invention is not necessarily limited in its application. In the accompanying drawing a vacuum container has been shown merely for the purpose of illustrating the principles of the invention. Obviously, the invention is equally applicable to controlling or regulating the temperature of any cold storage space or compartment in connection with which a refrigerant such as dry ice is employed. It will be further understood that the invention is susceptible of various changes and modifications from time to time without departing from the general principles or real spirit thereof and it is accordingly intended to claim the same broadly, as well as specifically, as indicated by the appended claims.

What is claimed as new and useful is:—

1. In a mechanism of the character described, a receiver for a supply of dry-ice, a tube extending through said receiver, and a pair of valves respectively adapted to seal the opposite ends of said tube, the bore of said tube being in communication with the interior of said receiver through an aperture provided in the portion of said tube embraced within the receiver, one of said valves being operative to permit the escape of the refrigerant gas in one direction when the pressure within the receiver exceeds a predetermined limit and the other of said valves being operative to permit the escape of said gas in the opposite direction when the temperature of the zone surrounding said valve rises above a predetermined limit.

2. In a mechanism of the character described, a receiver for a supply of dry-ice, a pair of tubes extending through and arranged with the opposite ends thereof projecting exteriorly of said receiver, a pair of valves for respectively sealing the ends of the tubes projecting through one side of the receiver, one of said tubes being apertured in the wall thereof for permitting the refrigerant gas generated within the receiver to enter the bore thereof, means for sealing the opposite end of said apertured tube, and temperature-controlled means operative to open said pair of valves whereby to permit the refrigerant gas to pass through said apertured tube into a compartment to be refrigerated and thence through the receiving tube to atmosphere.

3. A mechanism of the character defined in claim 2 wherein the means for sealing the opposite end of the apertured tube is in the form of a spring-pressed valve which is operative to permit the escape of the gas therethrough when the pressure within the receiver exceeds a predetermined limit.

ALLEN A. CANTON.